United States Patent [19]

Riggs et al.

[11] 4,091,070

[45] May 23, 1978

[54] RECOVERY OF COPPER

[75] Inventors: William F. Riggs, Globe; Jaime Veloz; Harry R. Dahlberg, both of Inspiration, all of Ariz.

[73] Assignee: Inspiration Consolidated Copper Company, Morristown, N.J.

[21] Appl. No.: 717,500

[22] Filed: Aug. 25, 1976

[51] Int. Cl.² ............................................. C22B 15/08
[52] U.S. Cl. ................................. 423/41; 75/101 R; 75/104; 75/117
[58] Field of Search ................ 75/117, 104, 101 R; 423/41

[56] References Cited

U.S. PATENT DOCUMENTS

| | | | |
|---|---|---|---|
| 2,563,623 | 8/1951 | Scott | 75/104 |
| 3,260,593 | 7/1966 | Zimmerley et al. | 75/117 |
| 3,441,316 | 4/1969 | Hannifan et al. | 299/5 |
| 3,574,599 | 4/1971 | Ortloff et al. | 75/104 |
| 3,669,651 | 6/1972 | Spedden et al. | 75/104 |
| 3,726,667 | 4/1973 | Fuchs | 75/101 R |
| 3,728,430 | 4/1973 | Clitheroe et al. | 75/101 R X |
| 3,777,004 | 12/1973 | Lankenau et al. | 75/121 X |
| 3,808,306 | 4/1974 | Smith et al. | 75/101 R |
| 3,886,257 | 5/1975 | Snell | 423/41 X |
| 4,017,309 | 4/1977 | Johnson | 75/101 R |

Primary Examiner—G. Ozaki
Attorney, Agent, or Firm—Pennie & Edmonds

[57] ABSTRACT

Copper is recovered from ores containing sulfidic copper minerals by forming the ore into a dump leach heap, and substantially saturating (i.e. thoroughly wetting) the ore in the heap with an aqueous strong acid solution containing 100 to 400 g/l $H_2SO_4$ and 5 to 50 g/l ferric ion. The ore thus saturated is cured in contact with the strong acid solution for a curing period of at least 2 days, and generally from 5 days to 6 months or even longer, depending on the character of the ore and its permeability by the acid solution. The ore in the heap may be run of mine size, or may be coarsely crushed, again depending on permeability to the strong acid solution. After the curing period, the ore in the heap is washed by percolating through it a weak acid solution containing up to 50 g/l $H_2SO_4$ and 5 to 50 g/l ferric ion. The wash solutions are collected and treated for copper recovery. Washing is continued until the copper content of the heap has been largely extracted.

18 Claims, 5 Drawing Figures

RECOVERY OF COPPER

BACKGROUND OF THE INVENTION

Copper is frequently recovered from extremely low grade ores and from mine wastes by dump leaching. Dump leaching involves percolating a dilute sulfuric acid solution through a heap of cupriferous material and collecting the copper-bearing acid solution after it has percolated through the heap. The addition of ferric ion (generally added as ferric sulfate) to the acid leach solution is common when the material being leached includes sulfide copper minerals. The copper-bearing leach solution after passage through the heap generally is treated with scrap iron to recover the copper by cementation. The copper-depleted acid solution from the cementation operation (after treatment of replenish its acid and ferric ion concentration when such is necessary) often is recycled for further leaching of the heap. U.S. Pat. No. 3,441,316 to Hannifan et al. and U.S. Pat. No. 3,669,651 to Spedden et al. described more or less conventional dump leaching operations.

Similar leaching procedures have been employed also for the recovery of copper from low grade copper-bearing materials by in situ leaching, as described for example in the Scott U.S. Pat. No. 2,563,623 and the Ortloff et al. U.S. Pat. No. 3,574,599.

It is characteristic of dump leaching operations that the total amount of copper recovered generally has not exceeded about half of the copper contained in the dump, and recovery of even this amount usually requires essentially continuous leaching for long periods of time, measured in years. For example, a typical dump leach operation might recover, over a period of 5 years, no more than 40% of the copper content of a dump, and the amount of additional copper recovered by extending the leaching operation for a longer period might not pay for the additional acid used. Such low and slow copper recovery has caused dump leaching to be considered a technique suitable only for mine wastes or other cupriferous material too low grade to merit treatment by conventional concentration and smelting procedures or by other procedures available for treating relatively high grade ores and concentrates.

Recently it has been found that substantially increased recoveries of copper from oxidized ores, containing significant amounts of substantially acid insoluble oxidized minerals (e.g. tenorite and melaconite) can be obtained by aging such oxidized ores in a dump leach heap in contact with a strong acid solution, containing upwards of 100 g/l of sulfuric acid, for a period of several days, and thereafter washing the aged ore with a dilute sulfuric acid solution containing about 5 to 40 g/l $H_2SO_4$. Substantially increased recoveries of insoluble or very difficultly soluble oxidized copper minerals are obtained by this treatment in a substantially shorter period of time than by conventional dump leaching operations using only a dilute acid solution as the leaching medium.

SUMMARY OF THE INVENTION

The present invention is based on our discovery that ores containing copper in the form of sulfide minerals may be successfully treated by a dump leaching technique, with high recovery of the copper from the sulfide minerals in a reasonably short period of time, by first curing the ore in a dump leach heap in contact with a strong sulfuric acid solution containing ferric sulfate or other source of ferric ion. Based on this discovery, the invention provides a method of treating a copper ore containing sulfidic copper minerals which comprises forming the ore into a dump leach heap, substantially saturating (i.e. substantially completely wetting) the ore in such heap with an aqueous solution containing 100 to 400 g/l $H_2SO_4$ and 5 to 50 g/l ferric ion, and maintaining the ore in the heap thus saturated in contact with such strong acid solution for a curing period of at least 2 days. Thereafter the cured heap is washed by percolating therethrough a weak acid wash solution containing up to 50 g/l $H_2SO_4$ and 5 to 50 g/l of ferric ion, and collecting such wash solution pregnant when dissolved copper after it has passed through the heap. Such washing of the heap preferably is continued until the copper content thereof has been largely extracted.

The method of the invention may be applied not only to wholly sulfidic ores, but also to ores containing oxidized minerals in addition to sulfidic minerals. Because of the high and relatively rapid recovery of copper from ore treated by the method of the invention, the ore may contain a higher concentration of copper than normally is considered desirable for treatment by a dump leaching procedure. Indeed, ores containing copper in concentrations high enough to warrant treatment by froth flotation and subsequent smelting or concentrate leaching may be successfully and economically treated by the method of the invention.

In some cases, particularly when the ore being treated is highly fractured so that penetration by the acid curing solution proceeds fairly easily, the ore in the heap may be run of mine material. Generally, however, coarse crushing is preferable. Crushing to a particle size of minus 4 inch is generally sufficient.

The strong acid solution used for saturating (thoroughly wetting) and curing the ore in the heap preferably contains from 150 to 300 g/l $H_2SO_4$ and from 10 to 25 g/l ferric ion. The amount of such solution required for saturating the ore in the heap generally is in the range from 5% to 15% by weight and in many cases will approximate 7% by weight, of the ore.

While a curing or aging period as short as two days is sufficient to condition some ores for recovery of most of the copper content by the subsequent acid washing, a curing period in the range from 5 days up to six months (or even longer) is more typical. Short curing periods suffice when the ore is readily penetrated by the strong acid solution, and when the sulfidic minerals are both reactive (as in the case with chalcocite, covellite, and bornite) and of relatively small particle size. Longer curing periods (up to six months or more) may be necessary for successful conditioning of relatively massive sulfides or sulfide minerals disseminated in hard substantially unfractured rock and particularly when such minerals react slowly with the strong acid solution (as do chalcopyrite and enargite). For a large number of ores such as typically occur in the southwestern United States, however, a curing period in the range from 10 to 25 days is satisfactory.

The method of the invention requires the presence in the strong acid curing solution of ferric ion, by which the sulfidic minerals are converted to a form suitable for extraction by the weak acid wash solution. The ferric ion concentration, however, need not be high. Concentrations in the range from 10 to 25 g/l ferric ion are usually very satisfactory. While the ferric ions generally are present in the acid solution as delivered to the dump, they may in some cases be supplied or augmented by in situ bacterial or other oxidation of ferrous ions present in the curing solution.

The wash solutions used to extract the copper from the cured ore in the dump leach heap is a weak sulfuric acid solution which in addition contains ferric ions. The wash solution initially delivered to the cured heap may contain little or no sulfuric acid, for such solution is adequately acidified by residual acid present in the ore as a result of the curing treatment with a strong acid solution. However, as the curing acid is washed from the ore, sufficient acid sould be introduced into the wash solution to maintain the desired acid concentration. In most cases, the wash solution should contain from 2 to 25 g/l $H_2SO_4$.

The amount of ferric ion present in the wash solution should approximate the amount present in the strong acid curing solution. Preferably the ferric ion concentration in the wash solution will be in the range from 10 to 25 g/l. As in the case of the strong acid curing solution, ferric ions may be introduced in whole or in part into the wash solution by in situ bacterial or other oxidation of ferrous ion present in the wash solution as such solution passes through the dump.

DESCRIPTION OF THE DRAWINGS

In the following description of the invention reference is made to the accompanying drawings, wherein.

DETAILED DESCRIPTION OF THE INVENTION

In carrying out the method of the invention commercially, a mass of cupriferous ore, containing much or all of its copper content in the form of sulfidic minerals (e.g. chalcocite, covellite, bornite, chalcopyrite, enargite, or a mixture of such minerals), is formed into a heap arranged for conventional dump leaching. This involves preparing a fluid impervious pad of substantial area, and then stacking the ore on the pad to a suitable depth. Solution distribution pipes are arranged in a grid pattern for discharging on to the heap the solutions used in its treatment. Solutions percolating through the heap drain from the impervious pad into a pond or other solution collection reservoir, from whence the solutions are collected for treatment.

Figure 1:
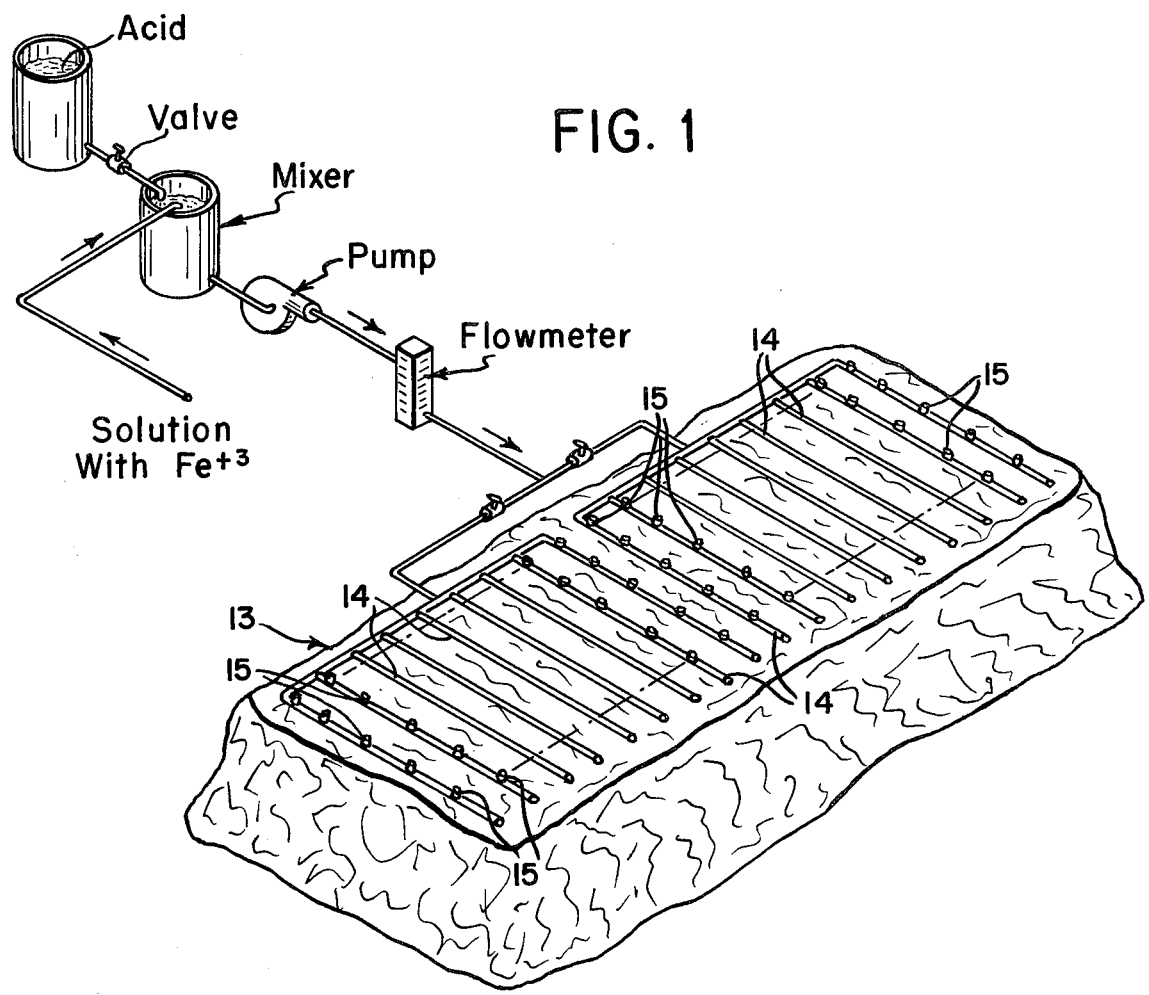
FIG. 1 is a schematic perspective view of a dump or heap leach operation in accordance with the invention.
Figure 2:
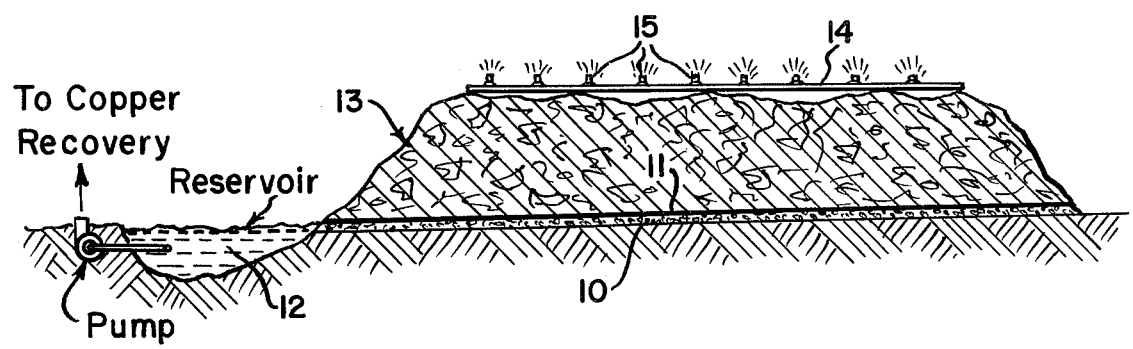
FIG. 2 is a cross section through a leach heap such as is shown in FIG. 1.

A dump leaching arrangement suitable for carrying out the method of the invention is schematically illustrated in FIGS. 1 and 2. The pad for the operation is prepared by leveling the ground and then preferably laying down a 1 or 2 inch layer 10 of finely crushed rock or sand. A water impervious sheet 11 of plastic material is laid on the thus prepared surface, and then advantageously is covered with a further layer several inches thick of finely crushed rock. The pad area is gently sloped toward one side or end (e.g. with a slope of say, 0.5%) to a pond or reservoir 12 adjoining the edge of the pad. Such reservoir may with advantage be lined with an extension of the plastic sheeting forming the pad, to prevent seepage of solutions from the reservoir into the ground. The finely crushed rock layers which are disposed on each side of the plastic throughout the pad area, and which serve to protect sheet from penetration by lumps of ore when the ore is stacked on the pad, need not be extended into the reservoir.

The ore to be leached then is stacked as a heap 13 on the pad to a suitable depth. An advantageous depth is about 10 feet, for with greater depths solutions percolating through them may tend to form channels which by-pass substantial portions of the ore in the heap. Substantial greater depths may, however, be employed provided suitable precautions against channeling are taken, or if successive lifts of ore are stacked on the heap and are leached successively. The lateral extent of the pad, and thus of the heap, is limited only by the amount of ore to be treated in a single dump leaching operation. The pad measurements generally are at least a few hundred feet on the side, and may extend for many hundreds of feet.

Minimum preparation of the ore prior to stacking of the heap is required. It is even possible, in some cases, simply to stack run of mine ore to the desired depth. However, it is generally preferred to crush the ore coarsely, say to minus 4 inch particle size. Whether or not, and to what extent, crushing is desirable depends on the nature of the ore and particularly on the extent to which it has been fractured by weathering by geologic processes, or by the mining method used in its recovery. The method of the invention requires that the solutions used be able to penetrate the ore rock and react with the sulfidic copper minerals present therein; and such penetration is facilitated if the ore is either highly fractured, or of moderate particle size. One of the advantages of the invention however, is that the expense of fine crushing and grinding, such as is necessary for preparing ores for flotation concentration, is avoided.

The invention is not limited as to the grade of ore that may be treated. Very low grade ores that conventionally are treated by dump leaching may be treated with advantage by the method of the invention; and likewise relatively high grade ores which might economically be subjected to froth flotation concentration also may advantageously be treated by the method of the invention. Overall recovery of copper from even relatively high grade ores (e.g. 1% copper) approximates the recoveries obtained by flotation concentration and subsequent leaching or smelting of the concentrates, yet avoids the operational and large capital expenses that are inherent in such treatment.

When the ore has been stacked on the pad to the desired depth, an array of solution distribution pipes 14 is laid on its upper surface. The pipes of this array are provided at appropriate intervals with spray nozzles 15 by which treatment solutions may be sprayed uniformly over the upper surface of the heap. In a typical operation, the pipes will be disposed approximately six feet apart, with spray nozzles arranged at like distance along the length of the pipes, so that the ore in the heap may be uniformly wetted by the treatment solutions. FIG. 1 shows schematically an arrangement for delivering an acid solution, into which ferric ion is introduced, to the solution distribution pipes 14.

In the first treatment stage in accordance with the invention, the heap of copper ore, prepared as described above, is substantially saturated i.e. the rock in the heap is thoroughly wetted, with a strong sulfuric acid solution containing 100 to 400 g/l $H_2SO_4$ and 5 to 50 g/l ferric ion. The saturated ore then is left in contact with this strong acid solution for a substantial curing period (at least two days). The invention is based on our discovery that sulfidic copper ores, when left in contact for a substantial period of time with a strong sulfuric acid solution containing ferric ions, is quite completely altered to readily soluble copper compounds. As the solution reacts chemically with the sulfidic minerals, it penetrates thoroughly through them, so that substantially the entire copper content of such minerals is solubilized. At the high acid concentration used there is no tendency for the ferric ion to become insolubilized as basic hydroxide or oxide iron compounds, and hence it is not lost during the curing period, even when the ore contains a considerable amount of acid consuming material.

Acid concentrations as low as 100 g/l are suitable for curing ores containing very little acid-consuming rock; and even with ores containing a considerable amount of carbonates and other acid-consuming minerals, acid concentrations need not exceed about 400 g/l. In most cases, the acid concentration of the strong acid curing solution will be in the range from 150 to 300 g/l of sulfuric acid.

The amount of ferric ion present in the curing solution should be usually in the range from 5 to 50 g/l, and most advantageously will be in the range from 10 to 25 g/l. Ferric ion is most conveniently supplied by mixing ferric sulfate solution with the strong acid solution. However, spent solutions containing much iron in the ferrous form may be used in some cases with reliance being placed on bacterial or other oxidation of the ferrous ions to ferric form in the heap.

The amount of solution required to saturate the ore in the heap depends largely on the character of the ore and the extent to which it is fractured. Generally however, a weight of strong acid solution equal to 5% to 15% of the weight of the ore in the heap saturates the ore quite thoroughly without substantial loss of such solution by percolation through and drainage from the heap.

With a large heap, a period of time from several days to a week may be required to deliver the strong acid solution to the heap and to enable it to penetrate therethrough and saturate the rock forming the heap. The curing period of two days or more is measured from th completion of delivery of the strong acid solution, so that all mineral-bearing rock in the heap is first thoroughly wetted and then benefits from the reactions which occur during the curing period.

In general, the curing period will be considerably longer than two days. The time required for curing depends mainly on two factors, (1) permeability of the ore to the strong acid solution and (2) the nature of the sulfide minerals. As noted above, highly fractured ores that are easily premeable by the solution, and wherein the sulfide minerals are finely divided and reactive, will cure rapidly. Longer curing periods will be required when the ore is less readily permeable. Also, if the predominant sulfide minerals react readily with the strong acid solution, as do chalcocite, covellite and bornite, then the curing period may be relatively short usually 5 to 50 days. But if much of the copper is present in the form of sulfide minerals which react only slowly or with difficulty, such as chalcopyrite or enargite, then the curing period should be long, usually more than a month and up to 6 months or more. For many of the highly fractured or weathered ores of the southwest United States, in which the predominant sulfide copper mineral is chalcocite, a curing period of 10 to 25 days is typical.

At the conclusion of the curing or aging period, the ore in the heap is washed with a dilute sulfuric acid solution containing up to 50 g/l $H_2SO_4$ and 5 to 50 g/l ferric ion. The wash solution after percolating through the heap, collects in the reservoir 12, from which it is pumped and treated for the recovery of its copper content. Washing is continued until the copper content of the heap has been quite completely extracted.

It is a major advantage of the invention that as a result of the curing treatment in contact with the strong acid solution, a very large fraction of the copper content of sulfidic minerals (and oxidic minerals also, if they are present) may be extracted in a relatively short period of time. Thus, total recoveries of copper approximating 90% of that present in the ore may often be extracted by dilute acid washing of the cured heap in a time of 1 of 2 months. Moreover, even though the ore is initially treated with very strong acid, the amount of copper recovered per pound of acid used in the process may actually exceed that obtained in ordinary dump leaching operations. It is on account of these advantages that the process of the invention may be used economically even in the treatment of relatively high grade sulfidic copper ores.

The dilute acid washed solution preferably contains from 2 to 25 g/l $H_2SO_4$. However, because the ore at the beginning of washing is saturated with a strong sulfuric acid solution, the wash solution may (initially at least) contain substantially no sulfuric acid and may rely on its collection of acid from the heap to build up a satisfactory degree of acidity.

The dilute acid wash solution preferably contains a concentration of ferric iron approximating that of the strong acid solution, that is, 5 to 50 g/l of ferric ion, and preferably a concentration of ferric iron in the narrower range from 10 to 25 g/l. The presence of ferric ion in the dilute acid wash solution contributes to oxidation of sulfidic copper minerals, insuring the conversion of these copper minerals to soluble form.

The dilute acid wash solution, which is continuously delivered to the upper surface of the heap through the array of solution distribution pipes and spray nozzles, penetrates through the heap and drains along the pad at the base of the heap into the reservoir 12. From the reservoir the solution is collected and pumped to any suitable treatment operation for the recovery of the dissolved copper. For example, the copper may be recovered by cementation or, more advantageously, by solid or liquid ion exchange. The acidic iron-bearing wash solution remaining after the copper has been extracted may be recirculated for further washing of the dump, after making whatever adjustments are necessary to its acid and ferric ion concentrations.

EXAMPLE

A 4-ton bulk sample of mixed sulfide-oxidized ore, as received from the mine, was screened and the minus 4 inch fraction was separated and used for this example.

Curing and leaching were performed in polyvinyl chloride pipe sections 11½ inches in internal diameter and 10½ feet in length. The bottom of the pipe column rested on a perforated plastic cap connected to a drainage tube leading to a pregnant liquor reservoir.

The minus 4 inch ore was further screened to give two fractions of −2 inch and +2 inch. This was done to provide a charge to the leaching column of 40% +2 inch −4 inch material and 60% −2 inch material. The charge to the pipe column weighed 650 lbs.

The minus 4 inch material was further given a screen analysis and each fraction, +2 inch, +1 inch, +½ inch, +¾ inch, +4 mesh, +20 mesh, +100 mesh +200 mesh and −200 mesh, (mesh sizes are U.S. Standard) was analyzed for total copper and for acid soluble copper. The calculated head for this screen analysis was 0.782% total copper and 0.366% acid soluble copper.

Operation of the pipe column was conducted to simulate treatment of a large heap, and solution feed rates were scaled down to approach large scale heap conditions. Flow-rate of solution used was equivalent to 30 gal/min/$10^4$ sq. ft.

The initial curing process consisted of applying (at the abovestated rate) a volume of strong acid solution amounting, by weight, to 7% of the weight of the ore, and containing 200 g/l $H_2SO_4$ and 15 g/l ferric ion (added as ferric sulfate) to ore in the column, and thereafter letting it stand for a curing period of 15 days. This volume of solution saturated the ore and caused sulfation of copper of the different sulfide and oxidized minerals to take place.

After this curing period, the ore was washed at the same rate with a solution of 15 g/l $H_2SO_4$ plus 15 g/l ferric ion. Daily samples of the "OFF" solution were analyzed and the results are plotted in FIG. 3, which thus shows the rate of extraction of copper.

Figure 4:
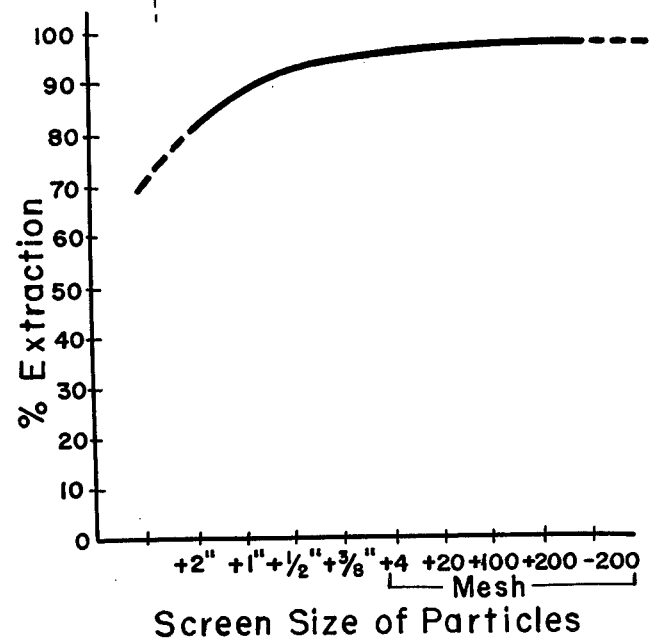
FIG. 4 is a graph showing the variation in the amount of copper extracted from ore particles crushed to progressively smaller sizes.

After 45 days the column was emptied and sampled for a screen analysis. EAch screen fraction was analyzed for total copper and acid soluble copper. FIG. 4 plots the copper recovery from the various sizes of ore particles.

Figure 3:
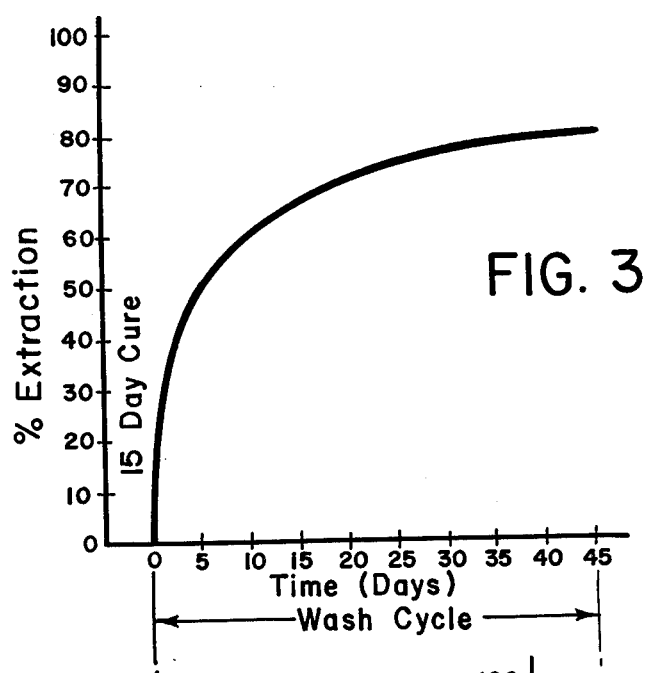
FIG. 3 is a graph of the rate of copper extraction from an experimental column of mixed oxide-sulfide ore.

Total copper recovery was 82.1% at the end of 45 days of washing, as shown in FIG. 3, based on the OFF solution analyses; but FIG. 4 shows a more accurate overall estimation of copper recoveries, based on tailing assays, to be 88.75%. Moreover, as shown in FIG. 4, the recovery was significantly less than 90% only for the +2 inch −4 inch pebbles.

Figure 5:
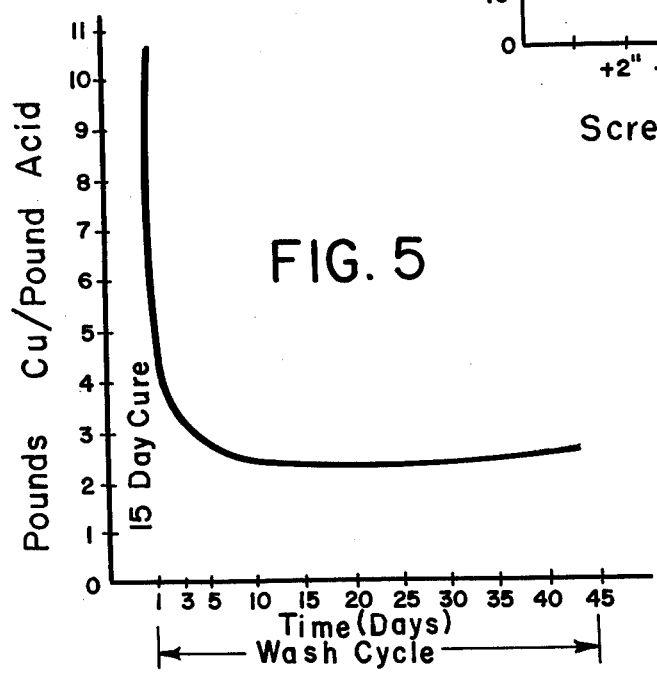
FIG. 5 is a graph showing the amount of copper recovered per pound of acid consumed over a wash period of 45 days from a column of mixed oxide-sulfide ore after curing with strong sulfuric acid and ferric sulfate solution.

FIG. 5 plots the pounds of copper recovered per pound of acid consumed against time of washing. Despite the use of strong acid for the curing operation, total acid consumption per pound of copper recovered, after 10 days of washing, was less than for a conventional dump leaching operation.

We claim:

1. A method of treating a copper ore containing sulfidic copper minerals which comprises forming the ore into a dump leach heap of a depth of at least about ten feet, substantially saturating the ore in such heap with an aqueous strong acid solution containing 100 to 400 g/l $H_2SO_4$ and 5 to 50 g/l ferric ion, maintaining the ore in the heap thus saturated in contact with such strong acid solution for a curing period of at least 2 days, thereafter washing the cured heap by percolating therethrough a weak acid wash solution containing up to 50 g/l $H_2SO_4$ and 5 to 50 g/l ferric ion, and collecting such wash solution pregnant with dissolved copper after it has passed through the cured heap.

2. The method according to claim 1 wherein the ore contains oxidized as well as sulfidic copper minerals.

3. The method according to claim 1 wherein the ore is crushed to minus four inch particle size.

4. The method according to claim 1 wherein the strong acid solution contains 150 to 300 g/l $H_2SO_4$.

5. The method according to claim 1 wherein the strong acid solution contains 10 to 25 g/l ferric ion.

6. The method according to claim 1 wherein the amount of strong acid used to saturate the ore in the heap is from 5% to 15% by weight of the ore.

7. The method according to claim 1 wherein the ore is held in contact with the strong acid solution for a curing period of 5 days to 6 months.

8. The method according to claim 1 wherein the sulfidic minerals comprise a substantial proportion of chalcocite and the ore is held in contact with the strong acid solution for a curing period of 5 to 50 days.

9. The method according to claim 8 wherein the ore is held in contact with the strong acid solution for a curing period of 10 to 25 days.

10. The method according to claim 1 wherein the sulfide minerals comprise a substantial proportion of chalcopyrite and the ore is held in contact with the strong acid solution for a curing period of 1 to 6 months.

11. The method according to claim 1 wherein the weak acid wash solution contains 2 to 25 g/l $H_2SO_4$.

12. The method according to claim 1 wherein the weak acid wash solution contains 10 to 25 g/l ferric ion.

13. The method according to claim 1 wherein the ferric ion is supplied in the form of $Fe_2(SO_4)_3$.

14. A method of treating a mixed copper ore containing both oxidic and sulfidic copper minerals including a substantial proportion of chalcocite which comprises coarsely crushing such ore, forming the crushed ore into a dump leach heap of a depth of at least about ten feet, substantially saturating the ore in such heap with an aqueous strong acid solution containing 150 to 300 g/l $H_2SO_4$ and sufficient ferric sulfate to supply 10 to 25 g/l ferric ion, maintining the ore in the heap thus saturated for a curing period of 10 to 25 days, thereafter washing the cured heap by percolating therethrough a weak acid wash solution containing 2 to 25 g/l $H_2SO_4$ and sufficient ferric sulfate to supply 10 to 25 g/l ferric ion, collecting the wash solution pregnant with dissolved copper after it has passed through the cured heap and recovering such dissolved copper from the wash solution, and continuing such washing of the cured heap until the copper content thereof has been largely extracted.

15. The method according to claim 14 wherein the strong acid solution contains substantially 200 g/l $H_2SO_4$ and substantially 15 g/l ferric ion.

16. The method according to claim 14 wherein the amount of strong acid solution employed to saturate the ore in the heap is substantially 7% by weight of the ore in the heap.

17. The method according to claim 14 wherein the ore in the heap is cured by maintaining it in contact with the strong acid solution for substantially 15 days.

18. The method according to claim 14 wherein the weak acid wash solution contains substantially 15 g/l each of $H_2SO_4$ and ferric ion.

* * * * *